G. G. EARL.
FLUID SYSTEM.
APPLICATION FILED FEB. 26, 1917.

1,430,731.

Patented Oct. 3, 1922.
2 SHEETS—SHEET 1.

INVENTOR.
George G. Earl
BY F. O. Richey
His ATTORNEY.

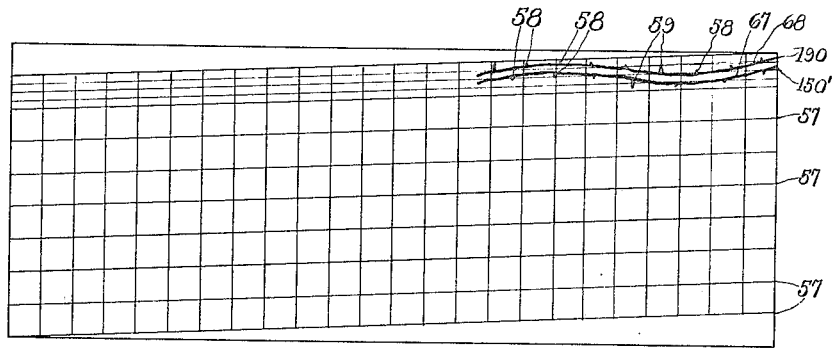
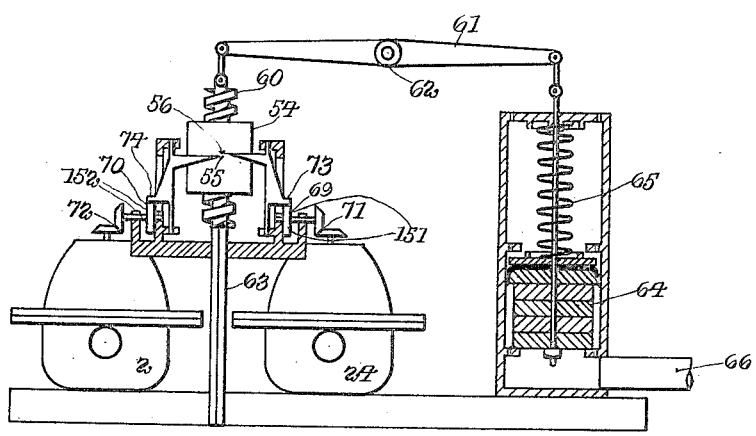

Patented Oct. 3, 1922.

1,430,731

UNITED STATES PATENT OFFICE.

GEORGE GOODELL EARL, OF NEW ORLEANS, LOUISIANA, ASSIGNOR OF ONE-THIRD TO CHARLES ARTHUR BROWN, OF LORAIN, OHIO, AND ONE-THIRD TO ALBERT BALDWIN WOOD, OF NEW ORLEANS, LOUISIANA.

FLUID SYSTEM.

Application filed February 26, 1917. Serial No. 150,227.

*To all whom it may concern:*

Be it known that I, GEORGE G. EARL, a citizen of the United States, residing at New Orleans, in the parish of Orleans and State of Louisiana, have invented certain new and useful Improvements in Fluid Systems; and I do hereby declare the following to be a full, clear, and exact description of the same, such as will enable others skilled in the art to which it appertains to make and use the same.

My invention relates to fluid systems, and more particularly to fluid measuring and regulating systems.

The objects of my invention and the invention itself will be understood from a description of a particular embodiment of the invention.

Fig. 2 illustrates one form of recording apparatus suitable for use in the embodiment of my invention illustrated in Fig. 1.

Figure 1:
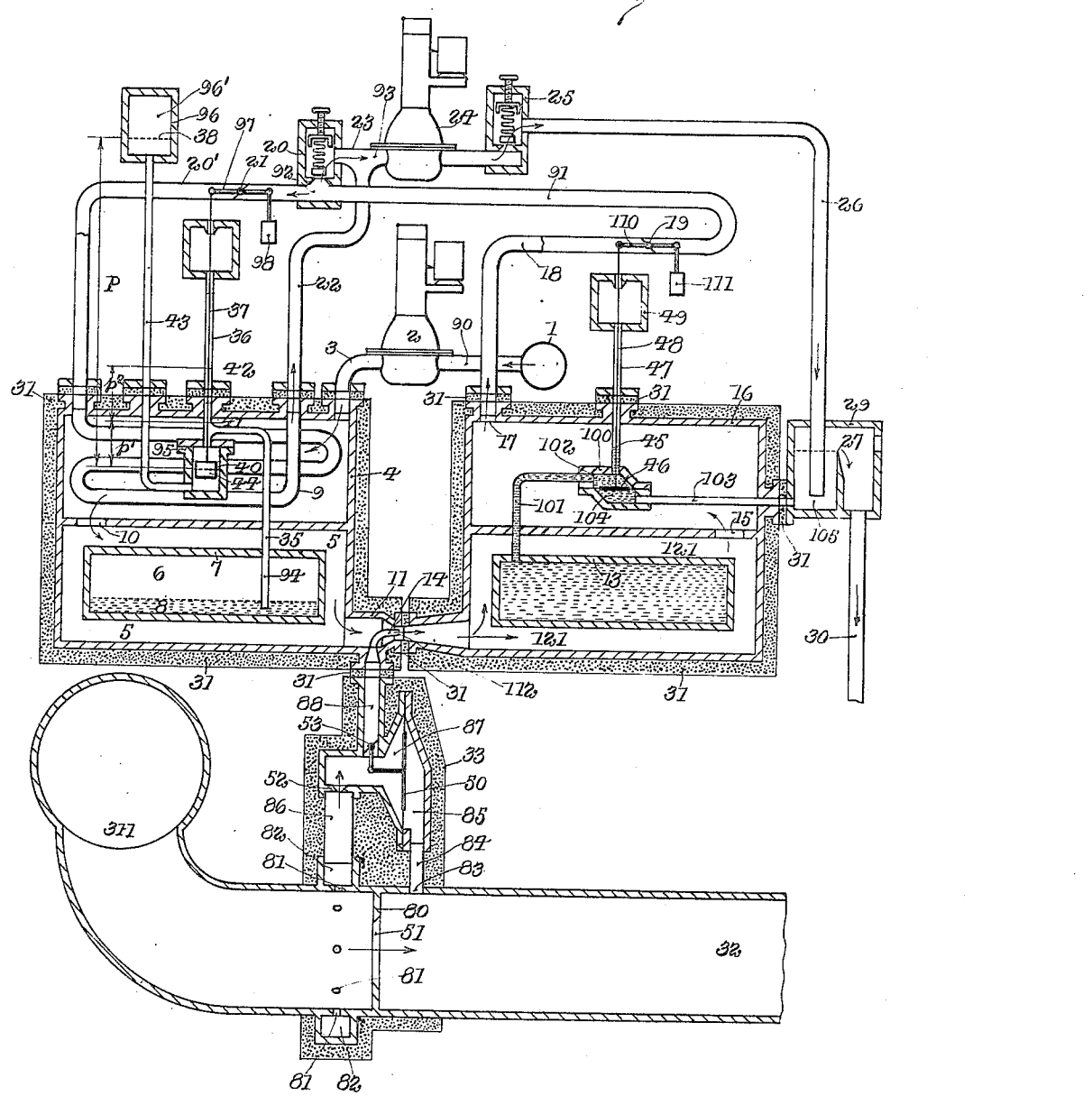
Fig. 1 shows partly in section and partly diagrammatically an embodiment of my invention.

Fig. 2ª illustrates a form of chart suitable for such use with records made thereon.

Referring now to the drawings and the embodiment of the invention shown therein, I have shown at 311 a source of fluid which may be a source of steam. For the purpose of describing this embodiment of the invention and its operation, it will be assumed that 311 is a source of steam, though it will be apparent that my invention may be used in connection with other fluids. The steam leaves the source 311 under pressure and passes through a main 32 to an outlet or destination, which is not illustrated in the drawing.

Mechanism is provided for creating a flow of steam proportional to the flow in the main 32. I contemplate the use of any suitable means for this purpose. In the embodiment shown a web is illustrated at 80 in the main 32, provided with an orifice 51. Openings are provided in the walls of the main 32 on both sides of the orifice 51. In the embodiment shown a plurality of openings 81 is shown on the high pressure side of the orifice 51, which places that portion of the main in communication with a chamber 82 surrounding the main. In the embodiment shown a single orifice 83 is shown on the low pressure side of the orifice 51. The opening 83 is connected through a pipe 84 with a cell 85 on one side of a movable means, such as a diaphragm 50. The chamber 82 is connected through a duct 86 and an orifice 52 with a cell 87 on the other side of the diaphragm 50. The diaphragm 50 controls a valve 53 in a duct 88 leading to a nozzle 14 in a duct 11. These parts are surrounded with heat insulating material 33 to maintain constant the temperature of the fluid passing therethrough.

As is well understood, the pressures on the two sides of the orifice 51 will act upon the diaphragm 50 to regulate the valve 53, so that a flow will pass through the duct 88 proportional to the flow through the main 32, and such flows will be maintained proportional.

At 1 is shown a source of fluid, such as comparatively cold water under a sufficient pressure, which passes through a duct 90, a recording and integrating meter 2, through a pipe 3, from which it is discharged, as indicated by the arrow, into the chamber 4, wherein there is a section of pipe, which may be coiled, as indicated at 9, and to be later described. The temperature of the water is varied in a suitable manner by the contents of the pipe 9. The water then passes through the opening 10 into the container 5, where it contacts with a cell 7, here spoken of as a temperature member, for the purpose of changing the temperature of the contents of such member. The water then passes, as indicated by the arrow, through the pipe 11, where it comes in contact with the steam from the nozzle 14, condensing the same and passes into the container 121, where it contacts with the cell 13, which will be spoken of herein as the second temperature member. The water then passes through the opening 15, through the chamber 16, out at 17, through the pipe 18 controlled by the valve 19, to regulate the rate of exit of the water to that required to produce the predetermined terminal temperature.

The water then passes through the duct 91 to the junction point 92, where it may pass through the pressure relief valve 20 to the junction point 93, or through the pipe 20′, the coils 9, the pipe 22, to the junction point 93, heating the water entering the container 4 to the required initial temperature, and then through the meter 24, the pressure relief valve 25, the duct 26, to the chamber 29, where it flows over the constant level flow 27 and through the pipe 30 to its destination, which may be a hot water well (not illustrated).

The parts are surrounded with heat insulating material, as indicated at 31. The cell 7 contains a quantity of liquid, indicated at 8 and a quantity of fluid 6 which may be a liquid, but which is preferably a gas. A duct 35 has an end 94 extending into the chamber 7 and below the surface of the liquid. The other end of the duct connects with a pipe 36 and with a cell 95. A U tube 43 is connected at one end with the cell 95 and at the other end with a second cell 96, spoken of herein as the vacuum cell. A quantity of fluid 40, which is preferably mercury, is placed in the tube. The space 96 is preferably a vacuum, or as near such as can in practice be realized. A float 44 is placed in the cell 95 and is connected by a rod 37 passing through the tube 36 to one end of a lever 97 by which a valve 21 in the duct 20' is controlled. In the embodiment shown a weight 98 is at the other end of the lever 97. The rod 37 very nearly fills the bore of the tube 36.

The container 13 is filled with an expansible fluid, preferably a liquid, which stands normally at the level indicated at 45 in the tube 47, or at such other level as is required to balance the pressure of the flow level 27. The bore of the tube 47 is almost filled by the rod 48.

At 100 is shown a chamber in which a movable member, such as a diaphragm 46, is placed. A duct 101 leads from the chamber 13 to a cell 102 on one side of the diaphragm and a duct 103 connects a cell 104 on the other side of the diaphragm 46 with a cell 105 in the chamber 29. The rod 48 connects the diaphragm 46 to one end of a lever 110, which controls the valve 19. The other end of the lever is connected to a balance weight 111 in the embodiment shown.

The apparatus operates to pass a fluid to the duct 11 at a constant temperature, maintained constant by the water in the coils 9, the quantity of water delivered to these coils being controlled and regulated by the valve 21. When the temperature of the water passing on the outside of the coils and contacting with the walls of 7 is reduced, the valve will be opened more, so that the quantity of warm water flowing through coils 9 will be increased and this will elevate the temperature of the water flowing to the duct 11. This apparatus operates automatically to maintain the temperature of the water constant, as will be better understood from a detailed description of the operation, to follow.

The quantity of flow of water through the system will be regulated and controlled by the valve 19, which in turn is governed by the temperature of the fluid in the chamber 13, so that the flow through the system will be proportional to this temperature, in a manner which will be better understood from a detailed description of the operation, to follow. In the embodiment shown any difference between the temperatures of the fluid flowing through 11 and that flowing through 121, 18, 91, etc., will be due solely to the steam which enters through the nozzle 14, so that the variations in the flow of water through the system will be proportional to the variations in the temperature and quantity of the steam.

More in particular, the operation is as follows: The steam flows from the source 311 through the orifice 51 in the main 32. The flow through the orifice is, of course, functional to the pressure difference on the two sides of the orifice, and these pressures are conveyed to the two sides of the diaphragm 50, which moves back and forth in response to variations in the pressure differences on the two sides of the orifice 51. The valve 53 is operated in proportion to the fluctuation of the diaphragm, admitting more or less steam to the nozzle 14, so that the flow through 88 will be proportional to the flow through the orifice 51. The steam passing through the nozzle 14, in striking the cold water, will be condensed and impart its heat to the water, thereby elevating the temperature of the mass of water in proportion to the heat of the steam.

Water flows from the source 1 through the meter 2 where the flow is measured and recorded. Entering the chamber 4, the temperature of the water will be changed by the contents of the pipe 9, assuming, of course, that the temperature of such contents is different from the temperature of the water. This apparatus is so regulated and proportioned that the temperature of the water which flows out of the duct 11 will be maintained constant in the following manner and by the following means:

If the temperature of the water drops slightly below the temperature at which it is desired to maintain it, the contents 6 of the chamber 7 will be lowered in temperature and consequently they contract in volume, so that fluid will flow back into the chamber from the duct 35; consequently, the mercury column will rise in the cell 95, lifting the float 44 and opening the valve 21, so that more warm water may flow into the coils 9 and cause the elevation of the temperature of the water in 4 to bring it back to normal, or the temperature at which it is desired to maintain it. Of course, the expansion of the fluid 6 will be in proportion to the change in the temperature of the water surrounding the chamber 7, and the intermediate mechanism will move in proportion thereto and the valve will be so moved, with the result that the movement of the valve 21 will be in proportion to the change in temperature of the water in the container 5, and by this means the water which passes through the duct 11 will always be maintained at the desired temperature. This temperature, however, will be varied, as I have explained, by the steam which enters through the nozzle 14, and will be varied functionally to the temperature of the steam. When the temperature is raised or lowered by the steam, the liquid in the cell 13 will be expanded or contracted, and the level in the tube 47 will be correspondingly raised or lowered, thereby increasing or decreasing the pressure upon the diaphragm 46, which is opposed by a constant pressure in the cell 104. As a result, the diaphragm 46 will be moved in proportion to the variations in temperature of the steam entering through the nozzle 14 and the valve 19 will be moved functionally thereto, thereby regulating the flow through the duct 18, so that it will be proportional to the temperature of the steam. The total flow through the duct 18 is measured and integrated by the meter 24.

The enlargement 49 provides storage space, without wastage, for the maximum amount of expansion without excessive increase of pressure, thus permitting of the use of thin temperature members, without danger of rupture or distortion and giving ample pressure difference for regulation, and the equivalent, in effect, of a closed system, while the light pressure open to atmospheric conditions permits the stem to work freely without a stuffing box.

The pressure relief valves 20 and 25 provide a sufficient difference of pressure on the two sides of the valve 20, to force any required amount of circulation through the valve 21, which said valve will permit.

The bore of the tube 36 being nearly filled by the stem or rod 37, no material quantity of fluid is required to fill it, and practically the whole effect of the expansion or contraction of the fluid in the chamber 7 is operative to change the mercury level 40, and since this mercury level is determined by the mercury column in vacuum on one side of the atmospheric pressure plus a fluctuating liquid level or pressure on the other side, it is evident that the pressure government is from absolute zero of pressure, as represented by the pressure P which is balanced by atmospheric pressure plus $p_1$ at highest atmospheric pressure and plus $p_1$ plus $p_2$ at lowest atmospheric pressure, and since the quantity of liquid in the tube 36 surrounding the stem 37 for the required range of pressures is negligible, as compared with the cubical expansion of the fluid in container 7 for slight variations of temperature therein, a definite amount of fluid is governed to a constant pressure measured from absolute zero of pressure through a constant temperature regulation. It will be evident to any one skilled in the art that the two methods of temperature regulation illustrated in Fig. 1 are interchangeable and that either may be used in both cases.

Figs. 2 and 2ª show an arrangement of the two meters 2 and 24, whereby two parallel lines may be drawn on a clock-driven drum 54 by the pens 55 and 56, which shall be between the spiral lines 57 and one of which by its position between said lines shall indicate the pressure of the steam flow, and each of which by markings 58 and larger markings 59 shall indicate the amount of flow which has passed the meters 2 and 24 and the time required for the passage of given amounts of flow.

The drum 54 is supported through the stem 63 by the beam 61 pivoted at 62, and propelled by clock-driven mechanism descends the spiral 60. The pipe 66 exposes the lower side of the piston 64 to the pressure of the steam flow to be measured, opposing said pressure against the spring 65. The spring 65 and the chart rulings 57 and each one of the pens 55 or 56 are so adjusted that with a stated steam pressure said pens would at all times follow the spirals 57. Any greater pressure under the piston 64 will raise said piston and lower the whole drum carrying mechanism, so that the pen will mark a proportional distance from said spiral which distance will, therefore, record the pressure above the pressure necessary to maintain the pen on the spiral lines 57. The pens 55 and 56 are in a stationary position supported by the wheels 69 and 70, so long as the faces of said wheels are smooth and circular. By placing projections 151 on wheel 69 and depressions 152 on wheel 70, however, the passage of each of said projections or depressions past the supporting arms 73 and 74 of the pens 55 and 56 will result in an upward mark by the pen 56 and a downward mark by the pen 55 each time said projection or depression passes and the spaces between these marks can be made to each indicate a definite amount of flow and each 10 or 5 mark to indicate a full or a half revolution, as shown by the marks 67, 68, wherein 67 shows the amount of water required to absorb a given amount of steam and be heated to a predetermined temperature thereby, by the spacing of the markings 58 and 59 thereon and by its position between the lines 150' and 190, the pressure from which said steam was drawn, and 68 shows by the markings 58 and 59 on its length the times required for successive equal amounts of water and steam combined to flow. At the same time, the meters 2 and 24 may perform the usual integration of the total flow passing through, as well as operating the pinions 71 and 72, which turn the pen actuating wheels 69 and 70.

The flow of water will be proportional to the heat units of the steam, and the flow being measured and recorded, such measurements and records when properly integrated, will give a reading and a record of the heat units of the steam. Thus, the heat units above a predetermined temperature can be measured. I can also measure the actual quantity of steam used to furnish such heat units and the initial pressure of the steam flow from which they result. All three of these measurements can be recorded, if desired, upon a single chart, as has been described in connection with Figs. 2 and 2ª, thereby maintaining information at sight which permits all of the characteristics of the steam flow to be located upon a proper diagram of steam characteristics. It will also be seen that I have discovered that for the measurement and regulation of flows of a heated compressible fluid like steam, the heat content above a fixed temperature is the best and most useful basis of measurement. This gives means of direct comparison for boiler efficiency and thermal efficiency of engines, and, if the steam is of any stated constant temperature, pressure and quality, it gives also the quantity of steam.

I have shown this particular embodiment and these particular details for the purpose of explaining my invention, and not that I wish to be limited to such embodiment and such details, as many departures may be made from both, without departing from the spirit of the invention.

I claim :—

1. In a fluid system, the combination of means to create a flow of compressible fluid, means to create a second flow initially maintained at a constant or substantially constant temperature, means to cause the first flow to impart to the second flow all or substantially all of its heat energy and mechanism to vary the rate of the second flow proportional to the variations in heat content of the first flow.

2. In a fluid system, the combination of means to create a flow of compressible fluid, means to create a second flow, apparatus controlled by the first flow for initially bringing and maintaining the second flow to and at a predetermined constant temperature, means to cause the first flow to impart to the second flow all or substantially all its heat energy, and mechanism controlled by the second flow after such heat energy has been imparted thereto to vary the rate of the second flow proportionally to the variations in heat content of the first flow.

3. In a fluid system, the combination of a main conduit through which flows a compressible fluid, a source from which said fluid flows, means to cause a flow of a similar fluid proportional to the main flow and at the same or substantially the same temperatures and pressures, means to create a third fluid flow and mechanism to bring the last named flow to a uniform or substantially uniform temperature, a duct for introducing said proportional flow to said last named flow and apparatus to regulate the rate of the last named flow and maintain it proportional to the heat contents above a predetermined temperature thereof after said proportional flow of fluid has been introduced thereto.

4. In a fluid system, the combination of means to create a flow of compressible fluid, mechanism to create a second flow with which the first is brought into contact, apparatus to bring said last named flow to a uniform or substantially uniform temperature, means to cause the heat energy of the first flow to be absorbed by the second flow and mechanism to vary the quantity of the flow of the second flow to be proportional to the variations in the heat energy of the first flow.

5. In a fluid system, the combination of means to create a flow of compressible fluid, means to create a second flow divided into two sections, apparatus controlled by the first section for causing the second section or a portion thereof to bring and maintain the first section to and at a predetermined constant temperature, means to impart to the fluid of the first section of the second flow all or substantially all the heat energy of the first named flow and mechanism controlled by the second section of the second flow to maintain the rate of the second flow proportional to the heat content of the first flow.

6. In a fluid system, the combination of means to create a steam flow, means to introduce said steam flow to a constant temperature flow of water to vary the temperature, and mechanism controlled by the combined flows to maintain the rate of the combined flows proportional to the heat content of the steam flow.

7. In a fluid system, the combination of means to create a fluid flow, means to create a second fluid flow divided into two sections, apparatus to bring the first section to and maintain it at a predetermined constant temperature including a valve controlled by the first section of the second flow to divert a portion of the second section thereof to vary the temperature of the first section, means to impart to the second section of the first flow all or substantially all the heat energy of the first flow and mechanism governed by the second section of the first flow for maintaining the flow thereof proportional to the heat content of the first flow.

8. In a fluid system, the combination of means to create a fluid flow, means to create a second fluid flow and means to combine the flows, a chamber through which the second flow passes before being combined with the first flow, a section of pipe associated with said chamber through which fluid may pass to vary the temperature of the fluid in the chamber, mechanism controlled by the first flow regulating the flow of fluid through said pipe to bring the second flow of fluid to a predetermined temperature and to maintain such temperature constant, a second chamber through which the combined flows pass, a device for regulating the rate of the combined flows and mechanism in said second chamber controlled by the temperature of the combined flows governing said regulating device.

9. In a fluid system, the combination of means to create a fluid flow, means to create a second fluid flow and means to combine the two flows, fluid operated apparatus controlled by the second flow for bringing the second flow to a predetermined temperature and maintaining such temperature constant, means for utilizing a portion of the combined flows for regulating the temperature of the second flow, mechanism controlled by the combined flows for maintaining the rate of the second flow and of the combined flows proportional to the heat contents of the first flow, means for causing a portion of the combined flows to be utilized to regulate the temperature of the second flow and for reuniting it with the remainder of the combined flows and apparatus actuated by the combined flows.

10. In a device of the class described, the combination of a source of fluid under pressure, a chamber through which fluid flows from said source, a pipe having a section associated with said chamber through which fluid flows to regulate the temperature of the flow from said source, a valve in said pipe and mechanism controlled by the flow from said source for governing said valve.

11. In a device for the measurement of a condensible fluid flow, a major flow of the condensible fluid, means for creating a pressure difference functional to such fluid flow, a minor condensible fluid flow, means for maintaining said minor condensible flow functional to said major condensible fluid flow, a third fluid flow, means for maintaining said third fluid flow functional to said minor condensible fluid flows, and means adapted to measure said third fluid flow, means for introducing said minor condensible fluid flow into said third fluid flow, means for condensing said minor condensible fluid flow and uniting said minor condensed fluid flow and said third fluid flow, and means to measure the united flows, a heat absorption member in the path of said third fluid flow whereby the temperature of the third fluid flow is maintained at a predetermined temperature, a second heat obsorption member in the path of the combined third fluid flow and the condensed minor fluid flow and means for maintaining the temperature in the second absorption member at a predetermined temperature.

12. In a device of the class described, the combination of a chamber through which fluid flows, a pipe having a section associated with said chamber, a fluid flow regulating valve in said pipe, a cell in said chamber with which the fluid in the chamber contacts, a fluid in the cell, means maintaining a vacuum, a second cell, a U tube, one end of which communicates with said means and the other end with said second cell, a float in the second cell, means to place the two cells in communication, and a device whereby said float controls said valve.

13. In a device of the class described, the combination of a chamber through which fluid flows, a pipe having a section associated with said chamber, a fluid flow regulating valve in said pipe, a cell in the chamber with which the fluid in the chamber contacts, means maintaining a vacuum, a U tube, one end of which communicates with said means, a second cell with which the other end of the U tube communicates, a heavy liquid in the U tube, a float in the second cell on the surface of the heavy liquid, a pipe placing the upper portion of the second cell in communication with the lower portion of the first cell and a device through which the float operates the valve.

14. In a device of the class described, the combination of a chamber through which fluid flows, a valve regulating the flow of fluid through the chamber, a cell in said chamber with which the fluid contacts, movable means opposed by a constant fluid pressure, a fluid in said cell adapted to be contracted and expanded against said movable means, and mechanism controlled by said movable means for governing said valve.

15. In a device of the class described, the combination of a fluid chamber through which fluid flows, a valve regulating the flow of fluid through the chamber, a cell in said chamber containing a liquid adapted to be expanded and contracted, a diaphragm to one side of which a constant pressure is applied, a pipe for placing the other side of the diaphragm in communication with the cell and means whereby the diaphragm controls the valve.

16. In a device of the class described, the combination of a cell through which fluid flows, fluid flow regulating means including a fluid pressure operated device, a tube having a small effective bore mounted over said pressure operated device and means to vary the head in said tube proportionally to the variations in temperature of the fluid in said chamber.

17. In a device for the measurement or regulation of a steam flow, the combination of means to withdraw from said flow a proportional part thereof, apparatus to introduce and condense said withdrawn proportional part into a flow of water maintained at a constant temperature, mechanism to so regulate the ratio of steam flow to water flow that said flow of water shall be increased in temperature by a constant predetermined amount and devices actuated by the flow of water.

18. In a device for the measurement of a steam flow, the combination of means to withdraw a proportional flow of steam, apparatus to introduce and condense said proportional flow of steam into a measured flow of water, mechanism to measure the combined flow of steam and water and means to measure the difference between said flow of water and said combined flow of water and steam as a measure of the quantity of steam in pounds thereof.

19. In a device for the measurement or regulation of a steam flow, the combination of means to introduce a steam flow into a measured flow of water maintained at a predetermined constant temperature, apparatus to regulate the ratio between the steam flow and the water flow, so that the combined flow of water and condensed steam shall be increased to a predetermined constant temperature and means to measure the combined flow of water and condensed steam, mechanism to interpret the measured water flow into heat units of steam flow and means to interpret the difference between the measured combined flow of water and condensed steam and the measured water flow into pounds of steam.

20. In a device to measure the heat units in a steam flow above a predetermined constant temperature, the combination of means to introduce said steam flow into a flow of water which is maintained at a predetermined lower constant temperature and to condense such steam flow therein, whereby the first predetermined constant temperature shall exist in the combined flow of water and condensed steam, and devices to measure the flow of water required.

21. In a device to record the quantity and characteristics of a steam flow, the combination of means to cause such flow to be condensed in a quantity of water at a constant temperature of such water sufficient to increase the temperature of such water to a predetermined higher constant temperature, mechanism to record the amount of water required therefor, means to record the combined amount of water and condensed steam and devices to record the initial pressure of the steam flow.

22. In a device to regulate a fluid pressure in any predetermined relation to zero of pressure, the combination of a fluid containing vessel, a movable member therein exposed to two fluids whose pressures are opposed to one another thereat, apparatus to cause one of these two fluid pressures to react against a commercial vacuum and means to govern one of said pressures to maintain it equal to the other.

23. In a device to regulate a fluid pressure in any predetermined relation to zero of pressure, the combination of a fluid containing vessel, a movable member therein exposed to two fluids whose pressures are opposed to one another thereat, means to cause one of these two fluid pressures to react against a commercial vacuum and means including a valve operated by the movable member to govern one of said pressures to maintain it equal to the other.

24. In a device to regulate a fluid pressure in any predetermined relation to zero of pressure, the combination of a fluid containing vessel, a movable member exposed to two opposed fluid pressures, mechanism to cause one of these pressures to react against a commercial vacuum and means operated by the movable member to govern temperature changes in a confined fluid whose pressure acts upon said movable member.

25. In a device for the measurement or regulation of a flow of fluid, the combination of a movable member, a pair of pressure chambers, means to communicate fluid pressures to the said pressure chambers, said movable member being adapted to be oppositely actuated by the said pressures, and means actuated by said member to maintain the flow to be measured or regulated at a constant temperature.

26. In a device for the regulation of fluid temperatures, the combination of a movable member exposed to two opposed fluid pressures, said member having a neutral position and adapted to be moved therefrom in response to variations in said pressures, means to dominate one of the pressures acting on said movable member in response to changes in temperature in one of said fluids and mechanism governed by the movable member to modify said fluid temperatures and thereby restore the movable member to neutral position.

27. In a fluid system, the combination of a fluid vessel, a movable member therein, means to expose to opposite sides of said member fluids under pressure, mechanism to change the temperature of one of said fluids and the pressure thereof on one side of said member and apparatus controlled by the movable member to restore the original pressure and temperature of said fluid.

28. The method of measuring the heat contents of a fluid flow, which consists in creating a flow of fluid proportional to the main flow and at the same temperatures and pressures, exposing another flow of fluid at a predetermined constant temperature to the proportional flow, and thereby changing the temperature of the other fluid flow, maintaining such other flow of fluid proportional to the heat contents of the first fluid flow and measuring the last named flow of fluid.

29. In a device to regulate a fluid pressure in any predetermined relation to a constant pressure, the combination of a fluid containing vessel, a movable member exposed to two opposite fluid pressures which have contiguous surfaces, mechanism to cause one of these pressures to react against a constant pressure and means operated by the movable member to govern temperature changes in the confining fluid whose temperature acts upon said movable member.

30. In a fluid system, the combination of a fluid containing chamber, sources of fluid pressure and ducts for conveying fluid under pressure from said sources to said chamber, said fluids being of different nature having contiguous surfaces and being opposed to each other in pressure at such contiguous surfaces, a cell containing a commercial vacuum and means to cause one of said fluid pressures in said chamber to react against said vacuum, a movable member in said chamber at the contiguous surface of the fluids therein and exposed to the fluid pressures in said chamber and mechanism controlled by said member to maintain one of said pressures equal to the other at their contiguous surfaces.

31. The method of measuring the heat contents in a fluid flow above a predetermined temperature, which consists in withdrawing therefrom a proportional flow, causing a flow of another fluid at said predetermined temperature to absorb the heat above said predetermined temperature in said proportional flow, regulating said last named fluid flow proportionally to the heat contents of said proportional flow and measuring the flow of the other fluid.

32. The method of evaluating a physical property of a flowing gaseous fluid, consisting in condensing the fluid and combining the resultant liquid with a flow of liquid whose corresponding physical property is known, then noting such physical property of the combined flow and comparing the values secured with the values relating to the known liquid flow physical property values.

In witness whereof, I have signed my name hereunto this 16th day of February, 1917.

GEORGE GOODELL EARL.